L. L. KNOX.
KETTLE.
APPLICATION FILED SEPT. 19, 1917.

1,370,123.

Patented Mar. 1, 1921.
2 SHEETS—SHEET 1.

L. L. KNOX.
KETTLE.
APPLICATION FILED SEPT. 19, 1917.
1,370,123.
Patented Mar. 1, 1921.
2 SHEETS—SHEET 2.
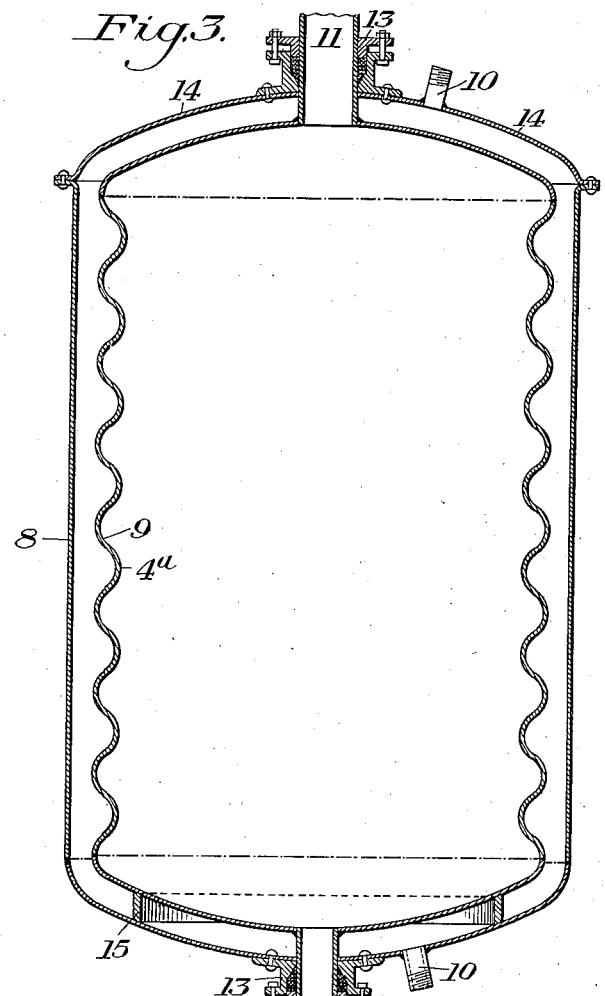
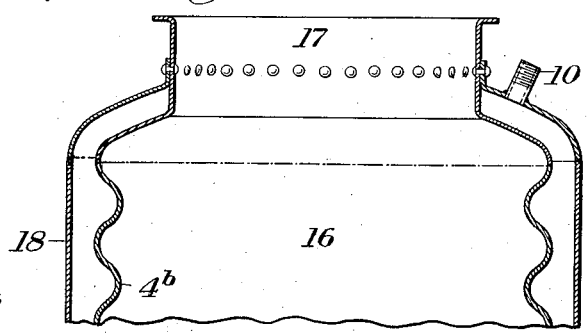
WITNESSES
INVENTOR

UNITED STATES PATENT OFFICE.

LUTHER L. KNOX, OF AVALON, PENNSYLVANIA, ASSIGNOR TO BLAW-KNOX COMPANY, OF PITTSBURGH, PENNSYLVANIA, A CORPORATION OF NEW JERSEY.

KETTLE.

1,370,123.   Specification of Letters Patent.   Patented Mar. 1, 1921.

Application filed September 19, 1917. Serial No. 192,195.

*To all whom it may concern:*

Be it known that I, LUTHER L. KNOX, a citizen of the United States, residing at Avalon, Allegheny county, Pennsylvania, have invented a new and useful Improvement in Kettles, of which the following is a full, clear, and exact description, reference being had to the accompanying drawings, forming part of this specification, in which—

Fig. 3 is a view similar to Fig. 2, but showing a modification, and

Fig. 4 is a sectional view of the upper portion of a kettle embodying another modification.

Figure 1:
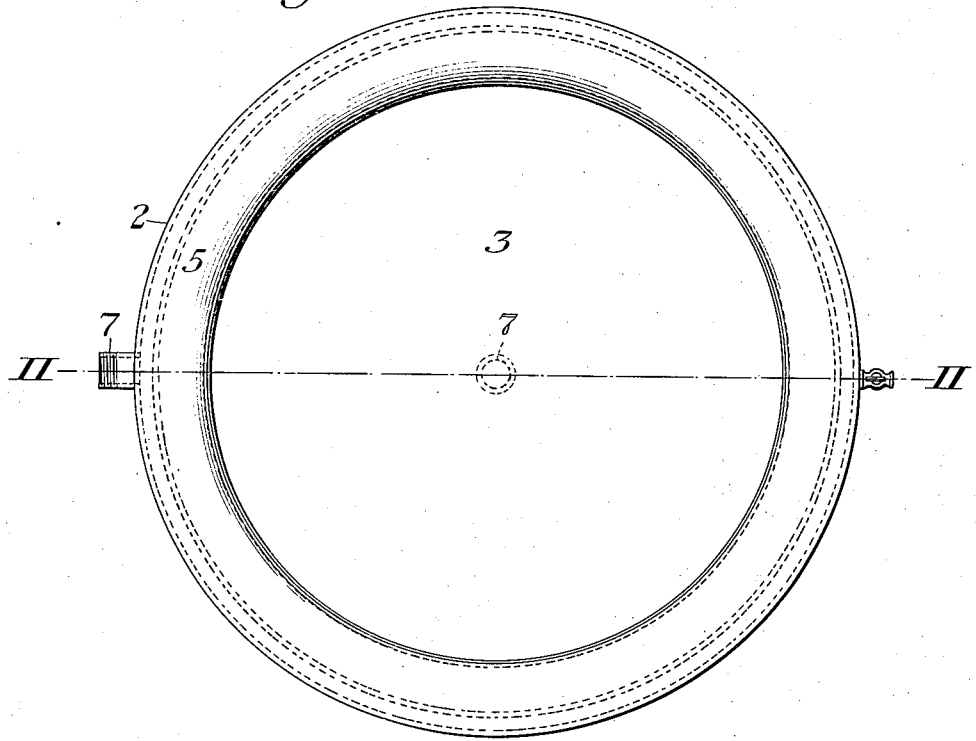
Figure 1 is a plan view of a kettle embodying my invention.
Figure 2:
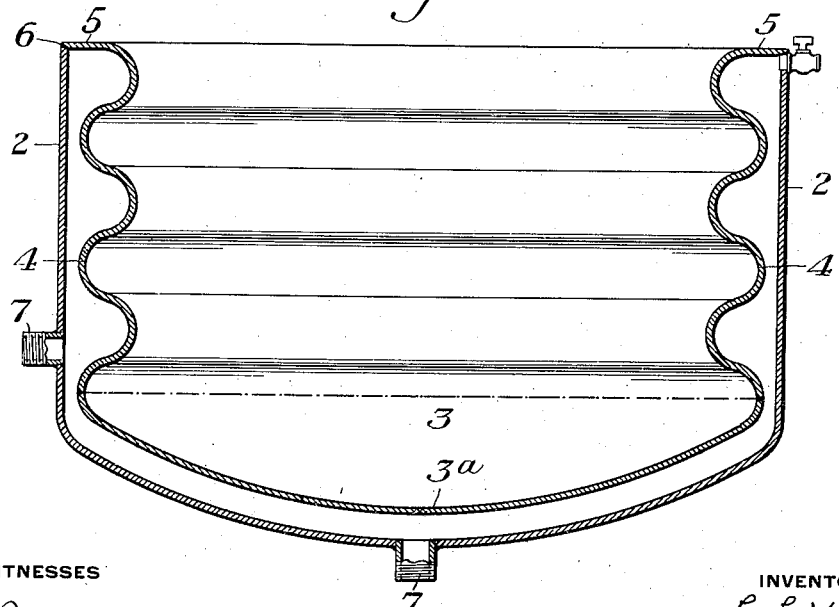
Fig. 2 is a section on the line II—II of Fig. 1.

My invention has relation to kettles such as those used in rendering various oils, lards, or for heating or cooking various substances, etc. The invention is designed to provide a kettle of this character of novel construction, capable of being manufactured of sheet metal at a relatively low cost, and which will be of strong and serviceable character.

Referring to the accompanying drawings, in which I have shown a kettle embodying my invention, the numeral 2 designates an outer casing or jacket open at the top and having a closed bottom. This casing or jacket may be formed from a single integral sheet of metal, or it may be of any other suitable construction, such, for instance, as that shown in my Patent No. 1,229,758, dated June 12, 1917. 3 designates an inner vessel consisting of a generally cylindrical body portion open at the top, and closed at the bottom by a plate $3^a$ welded or otherwise secured to the body. The vertical portion of this inner vessel is formed with a series of circumferentially extending corrugations 4. The inner vessel is of sufficiently smaller diameter than the outer casing or jacket to leave a surrounding heating space for steam or other heating fluid. This space may be closed at the top by means of the outwardly turned flange 5 of the inner vessel which is welded to the upper edge of the casing or jacket, as indicated at 6. The outer jacket is provided with circulating connections 7 which may consist of nipples welded or otherwise secured in openings formed in the jacket. The corrugations of the inner vessel greatly increase its strength, since they provide for a considerable amount of expansion and contraction, as well as for increased resistance to pressure. They also largely increase the area of both the internal and external heating surfaces of said vessel.

Fig. 3 shows a modification in which both the outer casing 8 and the inner vessel 9 are closed at both ends, except for the heating fluid circulating connections 10 of the outer jacket, and the top inlet 11 and bottom outlet 12 of the inner vessel. The inlet and outlet members extend through stuffing boxes 13 carried by the outer jacket. The latter is also shown as having a removable top portion 14. 15 is any suitable support upon which the inner vessel rests at the bottom, there being a free communication between the fluid circulating connections 10. The stuffing box connections take care of relative movements due to expansion and contraction.

Fig. 4 shows another modification, in which the inner vessel 16 has a large top opening 17, formed in a neck portion which extends up through the top of the jacket 18. The upper edge portion of the latter is riveted or otherwise attached to this neck.

My invention is susceptible of various other embodiments.

I claim:

A kettle of the character described, comprising an outer jacket and an inner vessel of sheet metal, the two being separated by a heating space, the inner vessel having circumferentially extending corrugations whereby the heating surface is increased and the outer vessel having plane walls to maintain a minimum heat radiating surface, said inner vessel having its connections with the outer vessel constituted and arranged to permit free lengthwise expansion and contraction of the inner vessel, substantially as described.

In testimony whereof I have hereunto set my hand.

LUTHER L. KNOX.